United States Patent
Yu et al.

(10) Patent No.: US 12,374,914 B2
(45) Date of Patent: Jul. 29, 2025

(54) SYSTEM WITH A PLURALITY OF TYPE-C PORTS AND CONTROL METHOD THEREOF

(71) Applicant: Silergy Semiconductor Technology (Hangzhou) LTD, Zhejiang Province (CN)

(72) Inventors: Tzuming Yu, Hangzhou (CN); Chenchia Wu, Hangzhou (CN); Pinjui Jen, Hangzhou (CN); Weichih Huang, Hangzhou (CN); Hongfeng Fan, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 749 days.

(21) Appl. No.: 17/238,474

(22) Filed: Apr. 23, 2021

(65) Prior Publication Data

US 2021/0344211 A1 Nov. 4, 2021

(30) Foreign Application Priority Data

Apr. 30, 2020 (CN) .......................... 202010361221.7

(51) Int. Cl.
*H02J 7/00* (2006.01)
*G06F 1/26* (2006.01)
*H02M 1/00* (2007.01)
*H02M 3/158* (2006.01)

(52) U.S. Cl.
CPC .......... *H02J 7/00712* (2020.01); *G06F 1/266* (2013.01); *H02M 1/0067* (2021.05); *H02M 3/1582* (2013.01); *H02J 2207/30* (2020.01)

(58) Field of Classification Search
CPC ............. H02J 7/00712; H02J 2207/30; H02M 1/0067; H02M 3/1582; G06F 1/266
See application file for complete search history.

(56) References Cited

U.S. PATENT DOCUMENTS

| | | | |
|---|---|---|---|
| 7,516,345 B2 | 4/2009 | Choi | |
| 7,701,701 B2 | 4/2010 | Koo | |
| 7,895,386 B2 | 2/2011 | Chen et al. | |
| 8,243,472 B2* | 8/2012 | Chang | H02M 1/10 363/16 |
| 9,652,351 B2 | 5/2017 | Srivastava et al. | |
| 2002/0062416 A1 | 5/2002 | Kim et al. | |
| 2012/0084592 A1 | 4/2012 | Lin et al. | |
| 2019/0204882 A1* | 7/2019 | Tseng | G06F 1/266 |
| 2019/0319545 A1* | 10/2019 | Wang | H01R 13/70 |

FOREIGN PATENT DOCUMENTS

| | | | | |
|---|---|---|---|---|
| CN | 110187731 A | * | 8/2019 | .............. G05F 1/56 |
| CN | 210201520 U | * | 3/2020 | |
| JP | 2017005983 A | * | 1/2017 | .............. H02H 9/00 |

* cited by examiner

*Primary Examiner* — Lincoln D Donovan
*Assistant Examiner* — James G Yeaman

(57) ABSTRACT

A system can include: a plurality of Type-C ports configured to connect with a plurality of external devices; a plurality of power conversion circuits having a dual-directional power transmission function, where each power conversion circuit is connected between a power supply terminal of the system and a corresponding Type-C port, in order to perform voltage conversion; and where each power conversion circuit is controlled to operate in different modes according to power information of each of the plurality of external devices.

20 Claims, 3 Drawing Sheets

SYSTEM WITH A PLURALITY OF TYPE-C PORTS AND CONTROL METHOD THEREOF

RELATED APPLICATIONS

This application claims the benefit of Chinese Patent Application No. 202010361221.7, filed on Apr. 30, 2020, which is incorporated herein by reference in its entirety.

FIELD OF THE INVENTION

The present invention generally relates to the field of power electronics, and more particularly to systems with a plurality of Type-C ports, and associated control methods.

BACKGROUND

The Type-C port is a connection port of the Universal Serial Bus (USB). Since it supports USB double-sided insertion, this type of port is more and more widely used in mobile terminals. The Type-C port defines various functions, such as charging, data transmission, audio signal transmission, and/or display output. However, mobile terminals on the market usually only have one Type-C port, and when used for input, this port cannot be used for output at the same time. Similarly, when this port is used for output, it cannot be used for input at the same time. In order to meet the function of voltage step-up and step-down at the same time, a voltage conversion chip often uses a buck/boost circuit, which can require more power switches, resulting in an increase in the volume and cost of the system.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
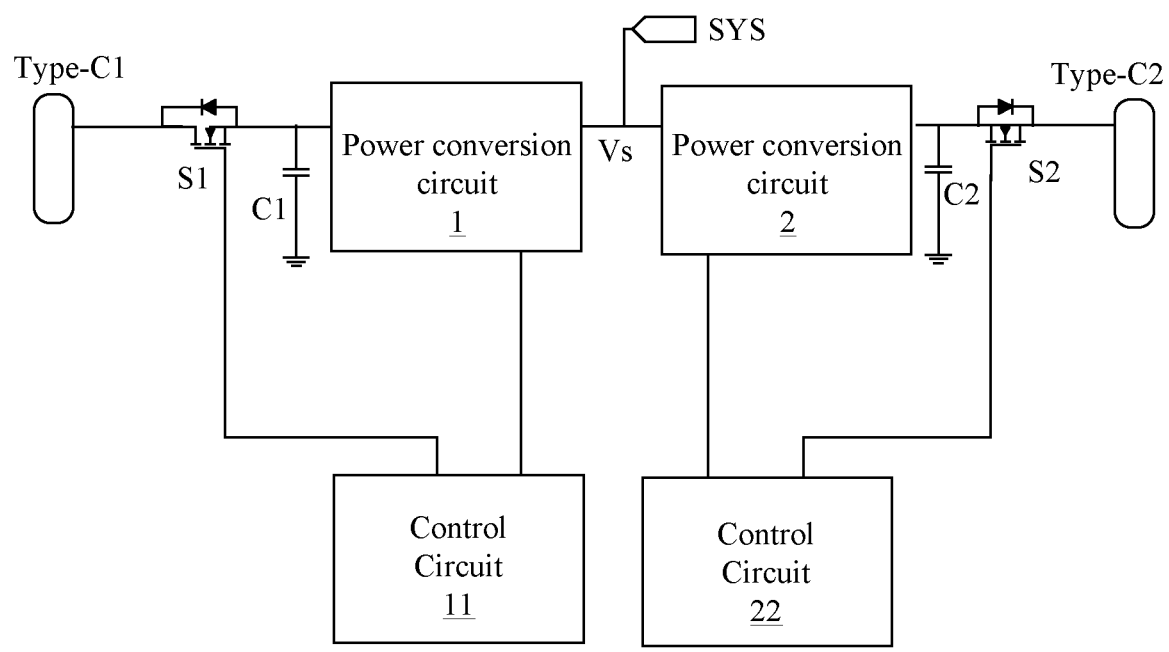
FIG. 1 is a schematic block diagram of a first example system with a plurality of Type-C ports, in accordance with embodiments of the present invention.

Referring now to FIG. 1, shown is a schematic block diagram of a first example system with a plurality of Type-C ports, in accordance with embodiments of the present invention. A system with two Type-C ports is taken as an example for illustration, and no power supply source is shown in this example system. The system can include first port Type-C1 used to be connected with an external device, second port Type-C2 used to be connected with an external device, power conversion circuit 1 coupled between first port Type-C1 and power supply terminal SYS, and power conversion circuit 2 coupled between second port Type-C2 and power supply terminal SYS. In this example, each power conversion circuit can include a dual-directional power transmission function.

In addition, in order to stabilize the voltage at each port, capacitor C1 can connect between first port Type-C1 and a reference ground, and switch S1 can connect between first port Type-C1 and capacitor C1, in order to prevent inrush current from flowing to first port Type-C1. Similarly, capacitor C2 can connect between second port Type-C2 and the reference ground, and switch S2 can connect between second port Type-C2 and capacitor C2, in order to prevent the inrush current from flowing to second port Type-C2.

The system can also include control circuit 11 that may be used to control the operation mode of power conversion circuit 1 according to power information of the external device connected to first port Type-C1. The power information can include power input and output capabilities of the corresponding external device. Control circuit 11 can control switch S1 to be in the turn-off state before energy transmission is performed between the system and the external device, in order to avoid the inrush current when the external device is connected to first port Type-C1. Control circuit 11 can also control switch S1 to be in the turn-on state during energy transmission.

The system can also include control circuit 22 for controlling the operation mode of power conversion circuit 2 according to power information of the external device connected to second port Type-C2. Control circuit 22 can control switch S2 to be in the turn-off state before energy transmission is performed between the system and the external device, in order to avoid the inrush current when the external device is connected to second port Type-C2. Control circuit 22 can also control switch S2 to be in the turn-on state during energy transmission.

When only one port (e.g., first port Type-C1) is connected to an external device with power supply capability, control circuit 11 can control the operation mode of power conversion circuit 1 according to the power output capability of the external device. When the power provided by the external device is insufficient to meet the needs of the system, control circuit 11 can control power conversion circuit 1 to stop working/operating. When the power provided by the external device meets the system requirements, control circuit 11 can control power conversion circuit 1 to start working to supply power to the system, such that the system can normally run. In this case, control circuit 11 can control power conversion circuit 1 to operate in a pass-through mode or a boost mode according to the power supply voltage required by the system and the voltage provided by the external device.

When the two ports are both connected with external devices, control circuits 11 and 22 may respectively determine the power output capabilities of the connected external devices. For example, the type of the external device can be determined. Generally, the external device is an adapter, and its power output capability can be greater than that of an external device (e.g., a mobile phone, a laptop, etc.). Also, one of the external devices with strong power output capability can be controlled to provide power supply voltage Vs to power supply terminal SYS of the system through the corresponding power conversion circuit, such that the system can be powered on and normally run. At the same time, the system can charge another external device through the corresponding power conversion circuit.

It should be understood that the operation mode of each power conversion circuit can be controlled to be in any of the buck, boost, or pass-through modes according to the voltage provided by the external device as the power supply, the power supply voltage of the system, and the voltage required by the device to be charged. For example, the control circuit corresponding to the external device as the power supply can control the corresponding power conversion circuit to operate in the pass-through mode or the boost mode according to the voltage that it can provide, the power supply voltage of the system, and the voltage of other external devices to be charged. The control circuit corresponding to the external device to be charged control the corresponding power conversion circuit to work in the pass-through mode or the step-down mode according to the power supply voltage of the system and the voltage required by itself.

Figure 2:
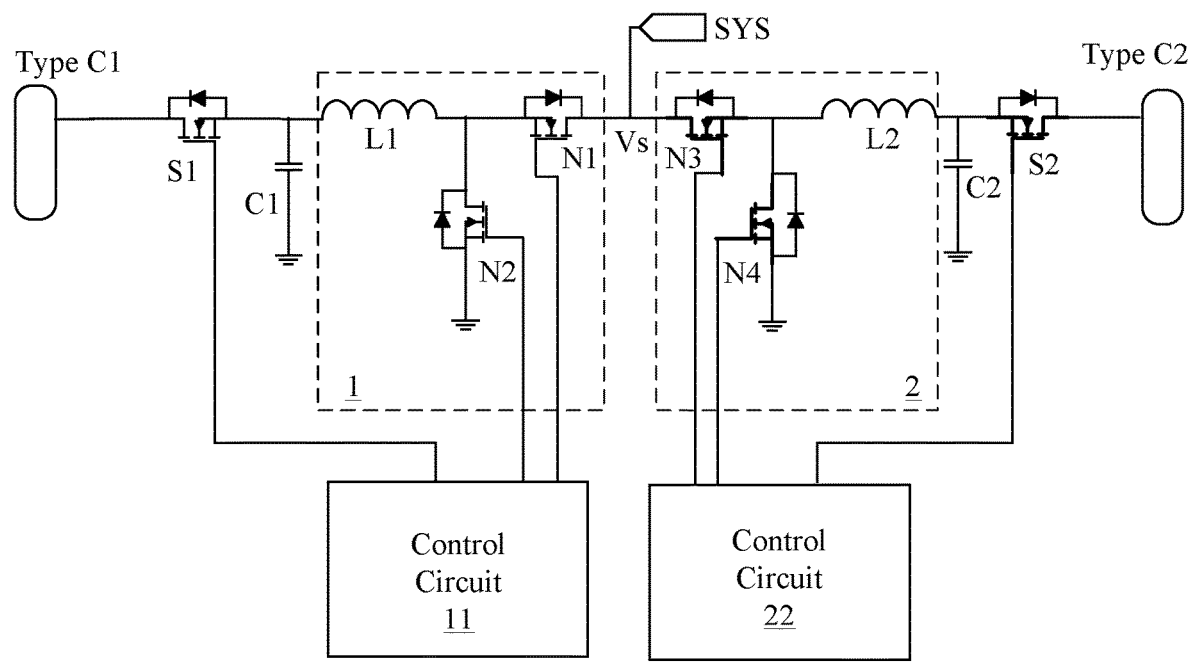
FIG. 2 is a schematic block diagram of a second example system with a plurality of Type-C ports, in accordance with embodiments of the present invention.

Referring now to FIG. 2, shown is a schematic block diagram of a second example system with a plurality of Type-C ports, in accordance with embodiments of the present invention. In this particular example, power conversion circuit 1 can include power switch N1, a first terminal of which being connected to power supply terminal SYS of the system, power switch N2 connected between a second terminal of power switch N1 and the reference ground, and inductor L1, having a first terminal connected to a common terminal of power switch N1 and power switch N2, and a second terminal connected to first port Type-C1. Power conversion circuit 1 can be controlled to operate in a buck, boost, or pass-through mode. Similarly, power conversion circuit 2 can include power switch N3, a first terminal of which being connected to power supply terminal SYS of the system, power switch N4 connected between a second terminal of power switch N3 and the reference ground, and inductor L2, having a first terminal connected to a common terminal of power switch N3 and power switch N4, and a second terminal connected to second port Type-C2. Power conversion circuit 2 can be controlled to operate in buck, boost, or pass-through mode.

The following describes example operation processes of the system under different situations. When the external device is connected to first port Type-C1, and second port Type-C2 is not connected with any external device, control circuit 11 can communicate with the external device connected to first port Type-C1 to obtain the power input and output capabilities of the external device, and to obtain the voltage and current that the external device can provide, thereby determining whether the external device can meet the power demand of the system. During this process, switch S1 may remain in the turn-off state.

When the external device can meet the power demand of the system, control circuit 11 can control switch S1 and power switch N1 to be turned on, and control power switch N2 to be turned off, such that power conversion circuit 1 can operate in the pass-through mode, and the voltage provided by the external device can be directly provided to power supply terminal SYS of the system, thereby enabling the system to be powered on and start operating. When the voltage provided by the external device is less than the voltage required by the system, control circuit 11 can also control switch S1 to be turned on, and power switches N1 and N2 to be turned on and off periodically, such that power conversion circuit 1 operates in the boost mode, and the voltage provided by the external device is boosted and supplied to power supply terminal SYS of the system.

It should be understood that the system may also include other types of DC/DC circuits to convert the power supply voltage of the system into different voltage levels after the system is powered on, in order to provide it to other parts of the system. When the power that the external device can provide is limited and insufficient to support the system to operate, control circuit 1 can continue to control switch S1 to remain in the turn-off state, and to control power switches N1 and N2 to remain in the turn-off state. When control circuit 22 detects that there is no external device connected to second port Type-C2, switch S2, and power switches N3 may remain in the turn-off state; that is, power conversion circuit 2 stops operating.

When an external device is connected to second port Type-C2, and first port Type-C1 is not connected with any external device, the operation principle is substantially the same as described above. When two external devices are respectively connected to first port Type-C1 and second port Type-C2 at the same time, each control circuit can obtain power information of the corresponding external device and communicate with each other, such that one external device with strong power output capability can be selected in order to supply power to the system, and the other external device can receive energy to be charged.

In this particular example, it can be assumed that the voltage needed by the system to operate is 10-20V, and first port Type-C1 is connected with a laptop, which can provide power of 15W (15V/1A), and second port Type-C2 is connected with an adapter, which can provide power of 60W (20V/3A). Thus, control circuits 11 and 22 can determine that the adapter connected to second port Type-C2 is more suitable for powering the system through communication. Therefore, control circuit 22 can control switch S2 and power switch N3 to be turned on, and control power switch N4 to be turned off, such that power conversion circuit 2 can operate in the pass-through mode, and power supply terminal SYS of the system can be directly provided with power supply voltage Vs of 20V, and thus the system can start to operate. At the same time, control circuit 11 can control switch Si to be turned on, and control power switches N1 and N2 to be turned on and off periodically, such that power conversion circuit 1 can operate in a buck mode, and power supply voltage Vs can be stepped down in order to generate a voltage of 15V to charge the laptop connected to first port Type-C1.

For example, when the power of the adapter connected to second port Type-C2 is 60W (12V/5A) and the voltage required by the laptop is 15V, control circuit 22 can control switch S2 to be turned on, and control power switches N3 and N4 to be turn on and off periodically, such that power conversion circuit 2 can operate in a boost mode. Thus, power supply voltage Vs received by power supply terminal SYS can be boosted to be 15V in this example. Also, control circuit 11 can control switch S1 and power switch N1 to be turned on, and power switch N2 to be turned off, such that power conversion circuit 1 can operate in a pass-through mode. Therefore, power supply voltage Vs can directly charge the laptop. Of course, first port Type-C1 and second port Type-C2 can be completely symmetrical. If the external device connected to first port Type-C1 has a stronger power output capability than the external device connected to second port Type-C2, the operation principle is substantially the same as described above.

Figure 3:
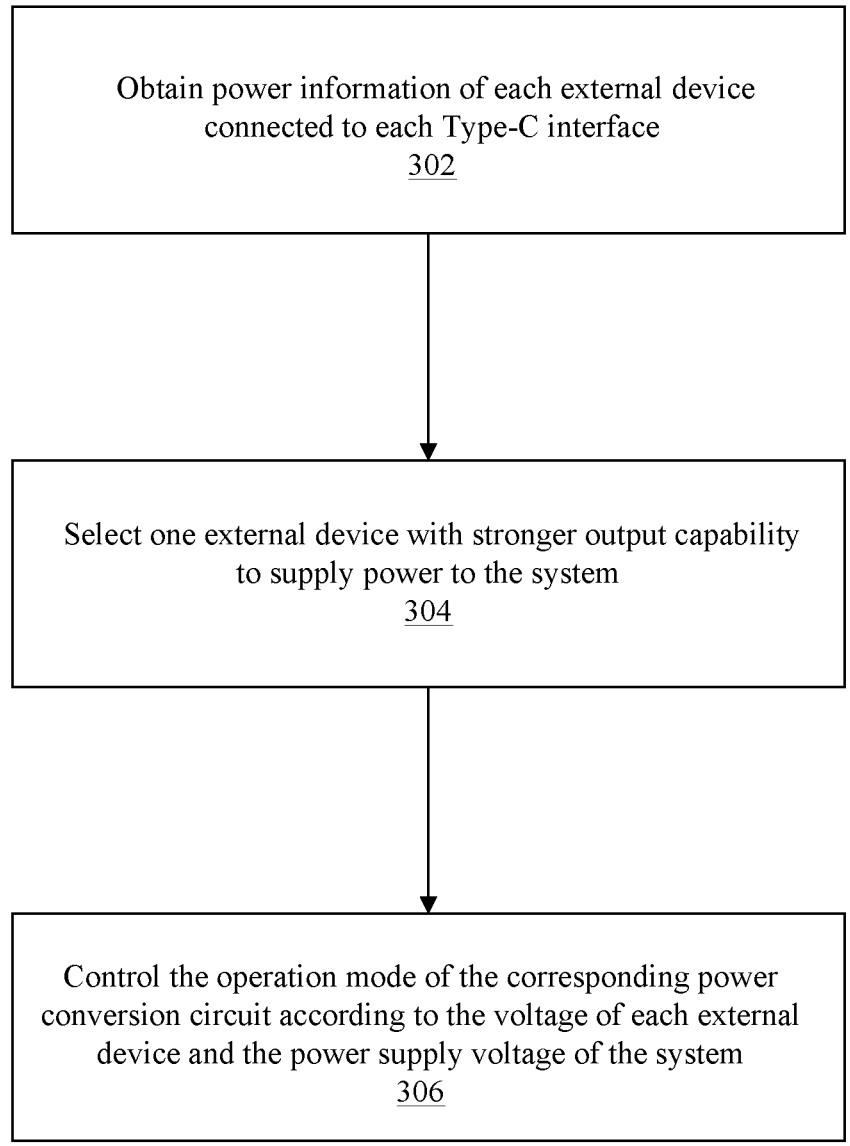
FIG. 3 is a flow diagram of example control method for the system with a plurality of Type-C ports, in accordance with embodiments of the present invention.

Referring to FIG. 3, shown is a flow diagram of example control method for the system with a plurality of Type-C ports, in accordance with embodiments of the present invention. At 302, power information of each external device connected to each Type-C port can be obtained, where the power information can include the power input and output capabilities of the external devices. At 304, one external device with stronger power output capability can be selected to supply power to the system. At 306, the operation mode of the corresponding power conversion circuit can be controlled according to the voltage of each external device and the power supply voltage of the system.

For example, according to the voltage provided by the external device with stronger power output capability, the power supply voltage required by the system, and the voltage required by other external devices to be charged, the corresponding power conversion circuit may be controlled to operate in a pass-through mode or a boost mode. According to the power supply voltage of the system and the voltage required by the other external device to be charged, the corresponding power conversion circuit may be controlled to operate in the pass-through mode or the buck mode.

In particular embodiments, in a system with dual Type-C ports, the external device can provide the required supply voltage to the system through one of the Type-C ports, and can transmit energy to the corresponding external device through other Type-C ports at the same time. Also, the power conversion circuit used for voltage conversion between the system and each external device can be controlled to operate in the buck, boost, or pass-through mode, such that the size and cost of the system can be reduced.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A system, comprising:
   a) a plurality of Type-C ports configured to connect with a plurality of external devices;
   b) a plurality of power conversion circuits having a dual-directional power transmission function, wherein each power conversion circuit is connected between a power supply terminal of the system and a corresponding Type-C port, in order to perform voltage conversion;
   c) wherein each power conversion circuit is controlled to operate in different modes according to power information comprising power input and output capabilities of each of the plurality of external devices;
   d) wherein each of the plurality of Type-C ports is selectively configured as an input terminal or an output terminal of the system; and
   e) wherein when a selected of the plurality of Type-C ports is configured as an input terminal of the system, an external device connected with the selected Type-C port supplies power to the power supply terminal of the system through a corresponding power conversion circuit, and when the selected Type-C port is configured as an output terminal of the system, the power supply terminal of the system supplies power to the selected Type-C port through the corresponding power conversion circuit.

2. The system of claim 1, wherein each power conversion circuit is controlled to operate in any one of buck, boost, and pass-through modes.

3. The system of claim 1, wherein each power conversion circuit comprises:
   a) a first power switch having a first terminal coupled to the power supply terminal of the system;
   b) a second power switch coupled between a second terminal of the first power switch and a reference ground; and
   c) an inductor having a first terminal coupled to a common terminal of the first and second power switches, and a second terminal coupled to a corresponding Type-C port.

4. The system of claim 3, wherein the first and second power switches are controlled to be turned on and off alternately, such that the power conversion circuit operates in a buck or a boost mode.

5. The system of claim 1, further comprising a plurality of capacitors that are respectively coupled between a corresponding Type-C port and a reference ground, in order to stable a voltage at the corresponding Type-C port.

6. The system of claim 5, further comprising a plurality of switches that are respectively coupled between a corresponding Type-C port and a corresponding capacitor, in order to prevent an inrush current from flowing to the corresponding Type-C port.

7. The system of claim 6, wherein:
   a) the plurality of switches remain in a turn-off state before power transmission is performed between a corresponding external device and the system; and
   b) the plurality of switches remain in a turn-on state during the power transmission between the corresponding external device and the system.

8. The system of claim 1, further comprising a plurality of control circuits, wherein each of the plurality of control circuits is configured to control operation modes of a corresponding power conversion circuit, in accordance with the power information of each of the plurality of external devices, and a power supply voltage required by the system.

9. The system of claim 1, wherein each power conversion circuit is connected to the corresponding Type-C port via a switch that is controlled by a corresponding control circuit.

10. The system of claim 8, wherein the plurality of control circuits communicate with each other to select one of the plurality of external devices with strong power output capability to supply power to the system.

11. The system of claim 8, wherein the control circuit corresponding to the external device that supplies power to the system controls a corresponding power conversion circuit to operate in a pass-through mode or a boost mode, in accordance with a voltage provided by the external device, the power supply voltage required by the system, and a voltage required by the external device to be charged.

12. The system of claim 11, wherein the control circuit corresponding to the external device that supplies power to the system controls the corresponding power conversion circuit to:
   a) operate in the pass-through mode to directly provide the voltage to the power supply terminal of the system when the voltage provided by the external device matches the power supply voltage required by the system and is not less than the voltage required by the external device to be charged; and
   b) operate in the boost mode to increase the voltage provided to the power supply terminal of the system, when the voltage provided by the external device is less than the power supply voltage required by the system, or when the voltage provided by the external device matches the power supply voltage required by the system and is less than the voltage required by the external device to be charged.

13. The system of claim 8, wherein the control circuit corresponding to an external device to be charged controls a corresponding power conversion circuit to operate in a pass-through mode or a buck mode, in accordance with the power supply voltage of the system and a voltage required by the external device to be charged.

14. The system of claim 13, wherein the control circuit corresponding to an external device to be charged controls the corresponding power conversion circuit to:
   a) operate in the pass-through mode when the power supply voltage of the system matches the voltage required by the external device; and
   b) operate in the buck mode when the power supply voltage of the system is greater than the voltage required by the external device.

15. A method of controlling a system with a plurality of Type-C ports, the method comprising:
   a) obtaining power information comprising power input and output capabilities of each of a plurality of external devices respectively connected to the plurality of Type-C ports;
   b) selecting one external device with stronger power output capability to supply power to the system;
   c) controlling operation modes of power conversion circuits respectively connected between a power supply terminal of the system and a corresponding Type-C port, in accordance with voltages provided by the plurality of external devices and a power supply voltage required by the system;
   d) wherein each of the plurality of Type-C ports is selectively configured as an input terminal or an output terminal of the system; and
   e) wherein when a selected of the plurality of Type-C ports is configured as an input terminal of the system, an external device connected with the selected Type-C port supplies power to the power supply terminal of the system through a corresponding power conversion circuit, and when the selected Type-C port is configured as an output terminal of the system, the power supply terminal of the system supplies power to the selected Type-C port through the corresponding power conversion circuit.

16. The method of claim 15, wherein the power information of each of the plurality of external devices comprises power input and output capabilities of each of the plurality of external devices.

17. The method of claim 16, further comprising controlling a corresponding power conversion circuit through which one external device supplies power to the system to operate in a pass-through mode or a boost mode, in accordance with a voltage provided by the external device, the power supply voltage required by the system, and a voltage required by the external device to be charged.

18. The method of claim 17, further comprising:
   a) controlling the corresponding power conversion circuit to operate in the pass-through mode to directly provide voltage to a power supply terminal of the system, when the voltage provided by the external device matches the power supply voltage required by the system and is not less than the voltage required by the external device to be charged; and
   b) controlling the corresponding power conversion circuit to operate in the boost mode to increase the voltage provided to the power supply terminal of the system, when the voltage provided by the external device is less than the power supply voltage required by the system, or when the voltage provided by the external device matches the power supply voltage required by the system and is less than the voltage required by the external device to be charged.

19. The method of claim 16, further comprising controlling a corresponding power conversion circuit through which the external device is charged to operate in a pass-through mode or a buck mode, in accordance with the power supply voltage of the system and a voltage required by the external device to be charged.

20. The method of claim 19, further comprising:
   a) controlling the corresponding power conversion circuit to operate in the pass-through mode to directly provide the power supply voltage of the system to charge the external device when the power supply voltage of the system matches the voltage required by the external device; and
   b) controlling the corresponding power conversion circuit to operate in the buck mode to reduce the power supply voltage of the system provided to charge the external device when the power supply voltage of the system is greater than the voltage required by the external device.

\* \* \* \* \*